J. J. STORER.
Improvement in Treating Offal so as to Produce Fertilizers and Destroy Offensive Gases and Vapors.
No. 132,498.　　　　　　　　　　Patented Oct. 22, 1872.

UNITED STATES PATENT OFFICE.

JACOB J. STORER, OF BOSTON, MASSACHUSETTS.

IMPROVEMENT IN TREATING OFFAL SO AS TO PRODUCE FERTILIZERS AND DESTROY OFFENSIVE GASES AND VAPORS.

Specification forming part of Letters Patent No. 132,498, dated October 22, 1872.

*To all whom it may concern:*

Be it known that I, JACOB J. STORER, of Boston, in the county of Suffolk and State of Massachusetts, have invented a new and useful Improvement in Deodorizing Furnaces and Processes, and in the Manufacture of Fertilizers, which the following specification and accompanying drawing sufficiently describe.

The object of my invention is to dispose of the refuse animal and other matter of slaughtering, packing, rendering, bone-boiling, glue-manufacturing, and like establishments, in such a way that no offensive or noxious odors or gases shall escape into the air, and at the same time to utilize these substances as fuels or fertilizers, creating a value where now there is offense and cost. My plan is by drying and slightly charring the "tank offal" and blood, to convert them into inoffensive matters valuable for fertilizing and other purposes; to burn the manure collected from the cattle, and, indeed, some of the animal matter, if desired, as fuel to decompose and burn the escape steam from the tanks and to deodorize the foul air of the establishments in such a manner that the outer atmosphere shall not be polluted by offensive gases, so that the most serious objections to the conducting of such establishments in populous neighborhoods shall be removed.

In the United States Patent No. 131,131, granted to me September 3, 1872, I specify that my plan was to burn or dry the refuse animal matter, and to decompose or deodorize the resulting gases by subjecting them to a high temperature and a contact or mingling with coke or coal, and in some instances, also, with sulphurous gas; and to accomplish this result I preferably used a reverberatory furnace, like that patented by James D. Whelpley and Jacob J. Storer, in the United States Patent Office, No. 109,785, granted November 29, 1870, and attached to it an auxiliary fire-place. I have made important improvements in the apparatus and processes, and have given them a wider range of efficiency. I preferably use the style of furnace shown in drawing, (although an ordinary reverberatory furnace will answer the purpose,) which is an improvement in some important respects upon that patented by me September 3, 1872.

Figure 1:
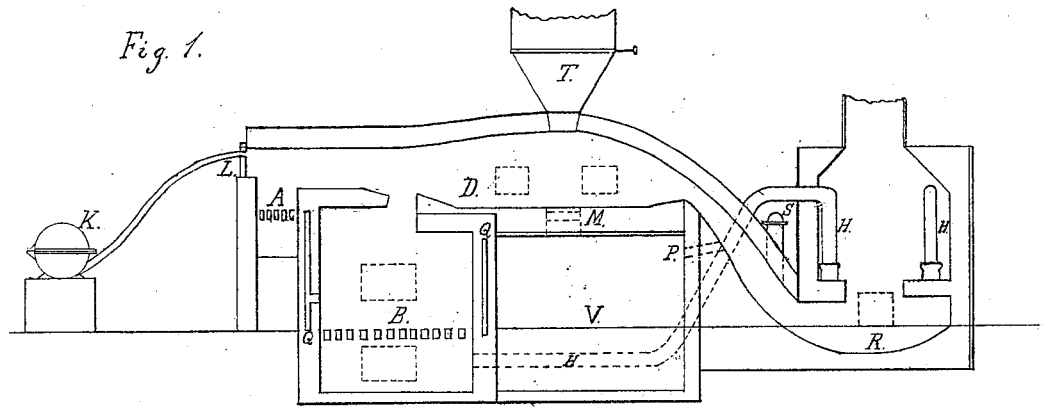
Figure 2:
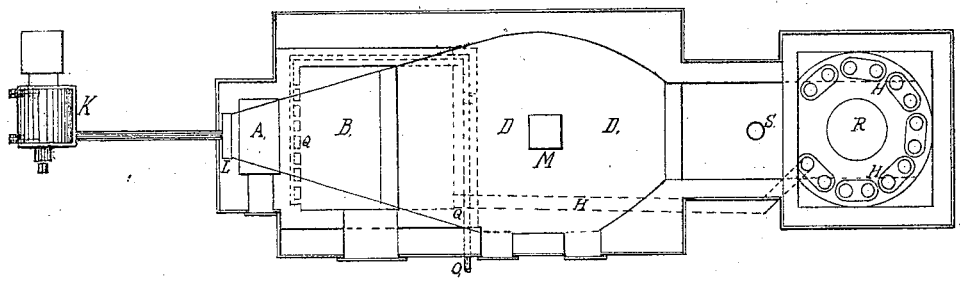

Figure 1 is an elevation of the furnace. Fig. 2 is a plan of the same.

Fires are built in the auxiliary fire-place A, and in the main fire-place B, and urged until the fire-places and surrounding brick-work have become well heated. Pulverized coal, with air, is then injected by the pulverizer or blower K through the slot or opening L in the rear of the furnace. This jet of pulverized fuel is ignited by the heat from the fire-place A, and, moving forward, burns in the body of the furnace D, quickly raising it to a high temperature. When the body of the furnace D has become sufficiently heated, the refuse animal matter, consisting of "tank offal," &c., is introduced therein, preferably through a hopper, T, in the roof, or through a side door, and is stirred about by suitable tools until the moisture and gases have been, to a sufficient extent, removed by the heat. In the bottom of the furnace-hearth is an opening, which is kept closed while the charging and drying of the material is in progress by a sliding, or revolving, or hinged slab or plate, M. By turning, pulling, or dropping this slab or plate the contents of the furnace, when sufficiently dried, are discharged into the pit or receptacle V, whence they may be removed at pleasure. The steam or gases arising from this hot substance, as discharged, may be conveyed by pipes P into furnace, fire-place, or smoke-stack to be deodorized. This manner of charging and discharging saves time and labor.

The complete and continuous operation of the furnace is substantially as follows: Fires are made in the fire-places A and B, and urged until, with the assistance of the pulverized fuel-jet, the body of the furnace D has become properly heated. Then the "tank offal," &c., is introduced into D, and stirred about until ready for discharge. Meanwhile the fire in B is principally maintained by burning manure or offal. The heat generated in the fire-place and by pulverized fuel passes into the body of the furnace and evaporates, decomposes, and burns the steam and gases escaping from the offal while it is drying, so that an intense flame results, filling the furnace and extending up the smoke-stack. The hot air made by forcing cold air through the pipes H H, is conducted under the fire-place B, to dry and aid in the combustion of the wet manure and other fuel therein. The steam from the rendering-tanks and the foul air from the establishment is led, by pipe O, into the hollow fire-bridge Q, to become heated before passing into the fire-place or furnace, or may be introduced into furnace-stack in any convenient way, so that they may pass through the flame, burning fuel, or highly heated air, and thus become deodorized and decomposed, and give additional heat by their combustion. In the bottom of the stack is a basin, R, of any required capacity, into which the blood and "soup" may be introduced, preferably, through the opening S, to be dried or evaporated, the drying or evaporation being effected, and the escaping gases being deodorized by the flame and heat passing from the furnace. Instead of this basin a chamber or oven for these purposes may be constructed, as an extension of the furnace or flue, and flame or hot air be made to pass over the surface of the blood or soup placed therein. By the means above described all the offensive matter of slaughtering, rendering, and like establishments may be disposed of without stench, and most of it converted into valuable commodities. The "tank offal" may be entirely converted to charcoal in the furnace; but I find that a most valuable fertilizer is produced by arresting the heating and drying process when the weight of the "offal" has thereby been reduced about fifty to seventy per cent. This concentrated offal contains a small percentage of bone phosphate and potash salts, while the remainder is almost purely nitrogenous animal matter, which, on decomposition in the earth, will develop a very large percentage of ammonia. This fertilizer requires for its thorough effectiveness no other treatment than, perhaps, coarse grinding in a mill of some kind. It will keep unimpaired in any weather or climate because of its dryness, and because it is slightly charred in its manufacture.

The use of pulverized fuel is not necessary to these results, but it is important as an economy, and for maintaining a constant unvarying high temperature in part of the furnace; for where but one fire-place is used the feeding into it of a fresh charge of wet manure or offal is likely to reduce the furnace temperature below that requisite for the decomposition and burning of the steam and gases escaping from the material under treatment; therefore an auxiliary fire is desirable lest the temperature fall, at times, below the effective point. One fire-place may, in some instances, suffice, provided a sufficiently powerful and constant blast is applied to maintain the requisite heat for the work, and provided but little wet offal or manure be used as fuel. But this method involves a greatly increased consumption of coal, and measurably defeats the economies of the process.

I find in operating this furnace and process that the combustion of the gases and decomposed steam creates a flame of great intensity, extending quite a distance up the smoke-stack, and I propose to utilize this flame in the generation of steam for the rendering-tanks and for other purposes in these establishments.

Having thus described my apparatus and processes, what I claim is—

1. The manufacture or production of a valuable fertilizer from the offal or refuse animal matter of slaughtering, rendering, and packing establishments, by treating it in a reverberatory-furnace in such a manner that no offensive gases or odors shall escape, substantially as described.

2. The treatment of steam from rendering-tanks, so that no offensive odors shall escape into the air, by passing it into heated chambers or hollow walls in some part of a reverberatory-furnace, and thence into the heated fire-place or body of furnace or smoke-stack, in the manner substantially as described.

3. Forcing or exhausting the offensive air and the tank-steam of rendering and slaughtering establishments, glue and fertilizer manufactories, and the like, through burning fuel or heated fire-place, furnace, or stack, in the manner and for the purpose substantially as described.

4. The evaporation or drying of the blood and soup of slaughtering, rendering, and like establishments, in the manner substantially as described.

5. The apparatus and processes, substantially as and for the purposes described.

JACOB J. STORER.

Witnesses:
CHARLES M. NICKERSON,
FRED. W. LONGLEY.